United States Patent [19]

Bohrer et al.

[11] Patent Number: 4,481,602

[45] Date of Patent: Nov. 6, 1984

[54] FONT COMPRESSION AND DECOMPRESSION FOR CHARACTER GENERATION

[75] Inventors: Kathryn A. Bohrer; Albert D. Edgar, both of Austin, Tex.

[73] Assignee: International Business Machines Corporation, Armonk, N.Y.

[21] Appl. No.: 251,602

[22] Filed: Apr. 6, 1981

[51] Int. Cl.³ .......................... G06F 5/00; G06F 3/00
[52] U.S. Cl. .................................. 364/900; 364/300; 364/731; 340/347 DD
[58] Field of Search ... 364/200 MS File, 900 MS File, 364/300; 358/260, 261, 263; 340/347 DD, 731

[56] References Cited

U.S. PATENT DOCUMENTS

| | | | |
|---|---|---|---|
| 3,898,627 | 8/1975 | Hooker et al. | 364/900 |
| 3,911,420 | 10/1975 | Lampson | 340/731 |
| 4,079,458 | 3/1978 | Rider et al. | 364/900 |
| 4,115,765 | 9/1978 | Hartke | 340/750 |
| 4,124,871 | 11/1978 | Morrin | 358/287 |
| 4,231,096 | 10/1980 | Hansen et al. | 364/523 |
| 4,334,246 | 6/1982 | Saran | 358/261 |
| 4,346,377 | 8/1982 | Green | 340/731 |
| 4,353,653 | 10/1982 | Zimmerman | 400/70 |

OTHER PUBLICATIONS

C. P. Thacker et al., "Alto: A Personal Computer", (Xerox Palo Alto Research Center 1979).

Primary Examiner—Raulfe B. Zache
Assistant Examiner—A. E. Williams, Jr.
Attorney, Agent, or Firm—Douglas H. Lefeve

[57] ABSTRACT

In a technique for storing data representative of characters and symbols of a font in a compacted manner, interstitial bank spaces between characters are removed. The proper symbol is addressed during decompression by combining a calculated approximate pointer with a limited range correction factor stored with the font to obtain an exact start of symbol pointer utilized to address the image data for the symbol. Also stored with the correction factor is data indicating the vertical positioning of the symbol within the character box.

15 Claims, 8 Drawing Figures

FONT COMPRESSION AND DECOMPRESSION FOR CHARACTER GENERATION

TECHNICAL FIELD

This invention relates generally to font generators used for the display of coded information, and more particularly to compressed font storage and font decompression for display.

BACKGROUND ART

In displaying coded information by means of, for example, a printer, CRT display device, etc., the image area is typically divided into a plurality of blocks into which characters or symbols may be displayed. On a normal full page, for example, there are typically 102 blocks or character boxes in each of 66 vertically displaced rows. In displaying characters or symbols on a typical CRT display each character box might hold a character or symbol consisting of 128 pels, or individual white or black picture elements, arranged in an 8×16 array. In displaying characters and symbols with a typical ink jet printer, the character boxes might contain 800 pels arranged in a 20×40 array. Each of these pel positions in a character box is filled in conjunction with the other pels according to one of, typically, 256 patterns in a font. The number of the pattern is derived from the character code associated dynamically with a particular character box; hence, the term "coded information".

The simplest, and by far the most common, method of storing these collections of patterns is to store one bit in memory for each possible pel location in the character box. Addressing a pattern in memory is then simply a matter of multiplying the number of the symbol by the amount of memory required to store each symbol to "skip over" all lower numbered symbols and point to the symbol of interest.

With a high resolution printer, for example, a 350 pel per linear inch printer, the amount of storage required for even a single font can grow very large. In the prior art it has been proposed to conserve memory by storing only the pels in a character box actually covered by a symbol. A period, then, requires less memory than an "X". The prior art system then addresses and places symbols indirectly according to the following algorithm summarized to include points relevant to the inventive concept herein. In this prior art system the character number points to a offset table, for which a pointer to the top of the symbol in the font table is read. With the symbol is stored a number indicating how much of the font storage is applicable to that character or symbol. Another number stored with each coded symbol in the text stream tells a position on the page at which display of the character or symbol is to start, distinguishing between a comma and an apostrophe which both have the same height but start at different levels on the page. Assuming one byte is required for the starting level, one byte for the height, and two bytes for the offset, and assuming 256 symbols in the font and 4000 character positions on the page, the system uses almost 5000 bytes for the pointers. In large systems this use of 5000 bytes for pointers represents a relatively small cost in relation to the system cost as a whole. However, in a small font for a CRT display, the pointers would occupy a space comparable with that saved by the font table compression. Thus the storage of blank space would be supplanted with storage of pointers to provide no net gain.

It would, therefore, be highly advantageous to provide a technique of font compression for storage and decompression for display requiring less memory per font to allow for the storage of more characters and symbols in a memory of limited size.

SUMMARY OF THE INVENTION

Accordingly, one or more fonts is constructed and compressed for storage in a memory to be decompressed for display purposes. The decompression begins with a calculation of an approximate pointer to the address of the symbol image data in the compressed font section of the symbol memory based on the number of the symbol in the font times the average height of a compressed symbol. Next, a limited range offset factor corresponding to the character to be displayed is read from a table and added to the approximate pointer to obtain a start of symbol pointer representing the address in the font section of the memory at which the beginning of the symbol is located. From the same address in the table containing the offset factor is an indicator of the starting vertical displacement level of the character or symbol within the character box, as it will appear displayed in uncompressed form.

The image data from the font memory is transfered to the display device to be displayed beginning on the display medium at the appropriate starting level and ending when all of the image data associated with the character or symbol has been transferred to the display device. The address in the font section of the memory associated with the end of the image data of a character is derived by determining the beginning address in the font section of the memory associated with the image data for the next succeeding character or symbol in that memory. The display of the current character or symbol is ended just prior to reading the contents at the beginning address of the succeeding character.

The foregoing and other objects, features, and advantages of the invention will be apparent from the following more particular description of preferred embodiments of the invention, as illustrated in the accompanying drawing.

DESCRIPTION OF THE PREFERRED EMBODIMENTS

For the purposes of this description the words "symbol" and "character" are used interchangeably to represent any image that may be represented in a character box including, as examples, characters and symbols of the English language, of the Chinese language, mathematical symbols, and other graphic sequences.

Figure 1:
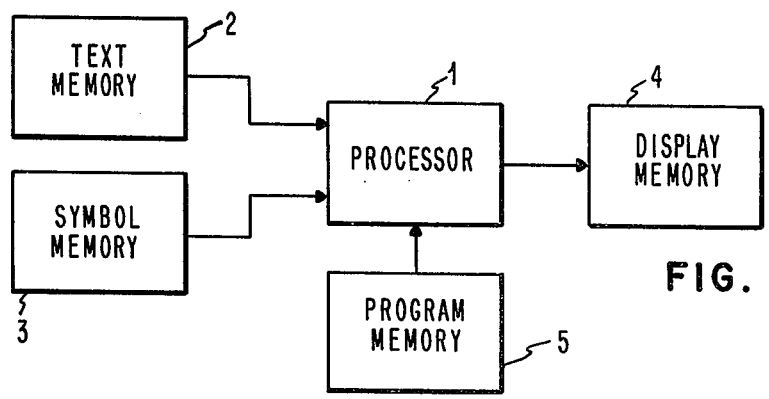
FIG. 1 is a block diagram of a system utilizing the technique of this invention.

Referring now to FIG. 1 a central processor 1 receives information from a text memory 2 and a symbol memory 3, for processing that information in accordance with the technique of this patent and for outputting the processed information to a display memory 4. The processor may, for example, be a commonly available microprocessor executing a program stored in a program memory 5, or, as is obvious to one skilled in the art, may be an appropriate configuration of hard-wired logic gates which do not require a program, in which case the memory 5 would not be included.

Figure 2:
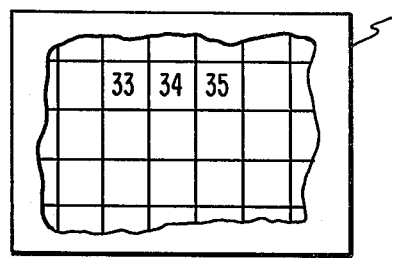
FIG. 2 shows the organization of the text memory of FIG. 1.

It will also be understood that the memories 2-5 may be partitioned segments of a common physical block of memory. The text memory 2 contains a series of numbers which correspond to particular characters and symbols to be displayed. A portion of this series of numbers is shown in FIG. 2 wherein the number 33, for example, is representative of the character "a", 34 is representative of the character "b", and 35 is representative of the character "c".

Figure 3:
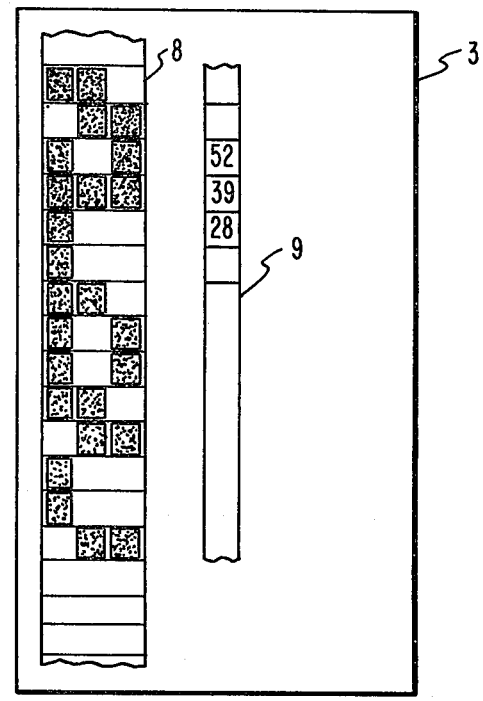
FIG. 3 shows the organization of the symbol memory of FIG. 1.

The symbol memory 3 contains the compressed font of the characters and symbols which may be decompressed for display purposes. FIG. 3 shows a portion of the two kinds of data stored in the symbol memory. A portion of the image data is represented by the scroll 8 in which the pels of a lower case "a", "b", and "c" are stored in compressed form. Also in symbol memory 3 is a pointer table 9 used in separating the scroll into single symbols according to the character numbers stored in text memory 2.

Figure 4:
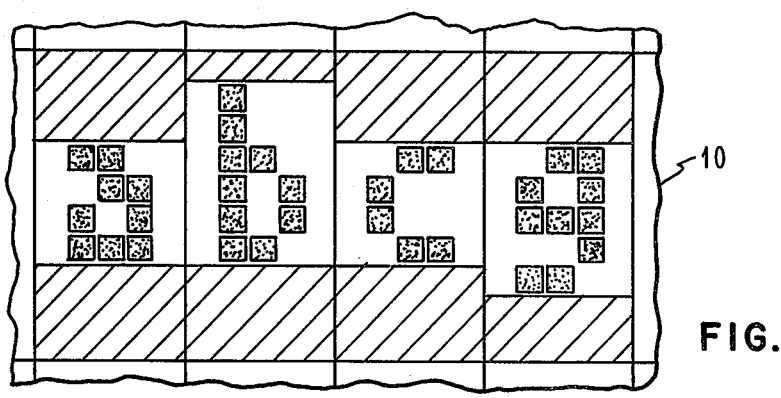
FIG. 4 shows the organization of the display memory of FIG. 1.

A portion of the contents of display memory 4 are shown in FIG. 4. Four character boxes containing a lower case a, b, c, and g are shown in FIG. 4 as being representative of the contents of display memory 4. Each of the character boxes, or page display locations, shown in FIG. 4 includes the image data pels, represented by on and off bits from scroll 8 of the symbol memory 3. This configuration of pels representative of a character or symbol are vertically displaced within the appropriate character boxes according to data stored in the pointer table 9 of symbol memory 3, as will be described in more detail hereinafter.

In FIG. 4 the blank areas of the character boxes surrounding decompressed character and regenerated by processor 1 in the proper positions within the character boxes are shown by cross-hatching. The cross-hatching represents storage saved in symbol memory 3 by eliminating blank horizontal lines of pels above and below a character in its character box from the font storage scroll 8 of memory 3. A quantitative example of the memory savings is illustrated in FIG. 5 wherein all characters from a prior art font are charted according to the number of occurrences of the various character and symbol vertical sizes.

Figure 5:
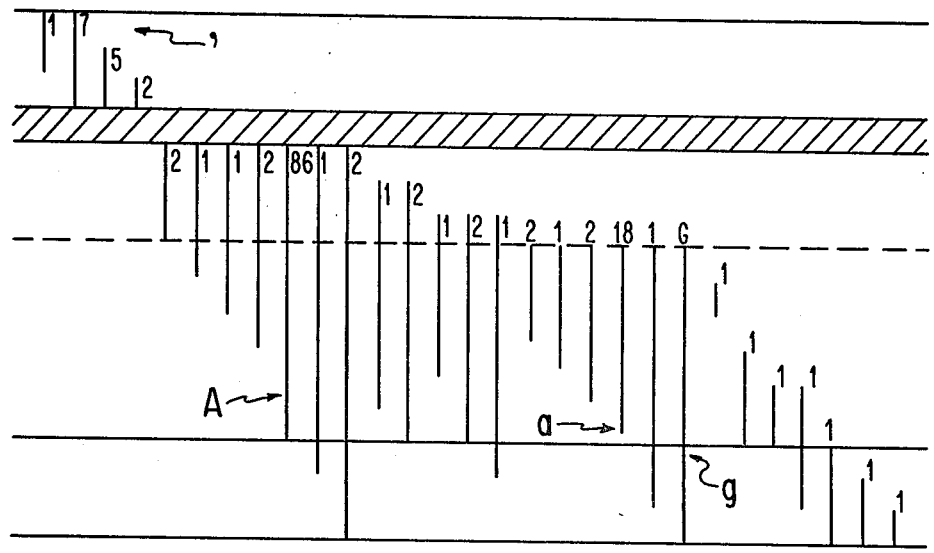
FIG. 5 charts the number of occurrences of the various character and symbol vertical sizes of a typical display font.

Referring to FIG. 5 the character "A" extends nine pels vertically beginning at the same vertical level within the character box as do 85 other characters and symbols in the font. The vertical scale in FIG. 2 represents the level of characters within the character box. The vertical lines represent vertical character extent or height and the number associated with each line indicates the number of characters of that level and height. Some of the lines are labelled with typical characters in the font, such as "A", "a", and "g". Diacritics are included only once and without subcharacters as these characters may be generated by an overstrike technique.

The savings from font compression and decompression illustrated by the example in FIG. 5 appears to be about fourfold. However, as is seen in FIG. 3, the font scroll 8 of symbol memory 3 must also be accompanied by the pointer table 9 of symbol memory 3. Although this pointer table, necessary for decompression, somewhat reduces the fourfold decrease in the symbol memory requirement in this example, the technique of this invention minimizes the size of the pointer table 9 to provide about a threefold overall storage compression. In addition, the technique lends itself to very rapid execution if implemented in software, thereby increasing system performance while decreasing memory requirements.

Figure 6:
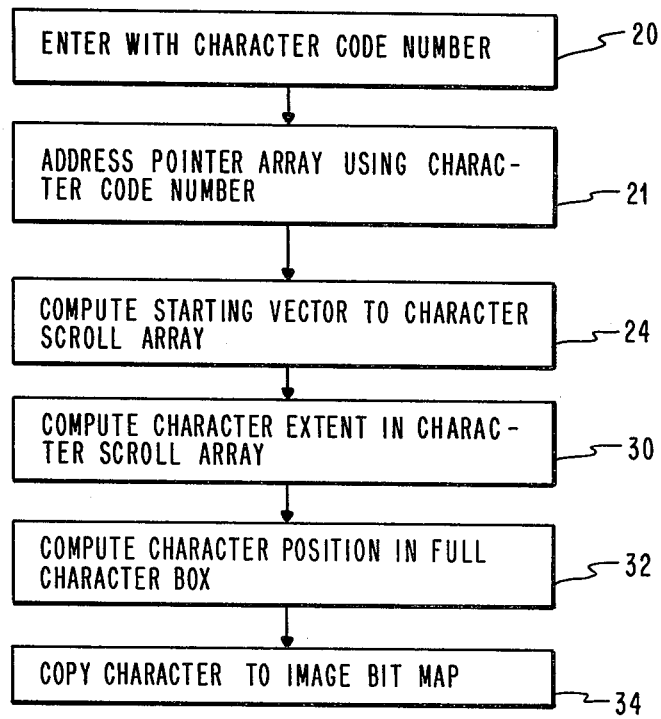
FIG. 6 shows a chart of the steps of the technique of this invention used for decompressing the compressed character font for display purposes.
Figures 7, 8:
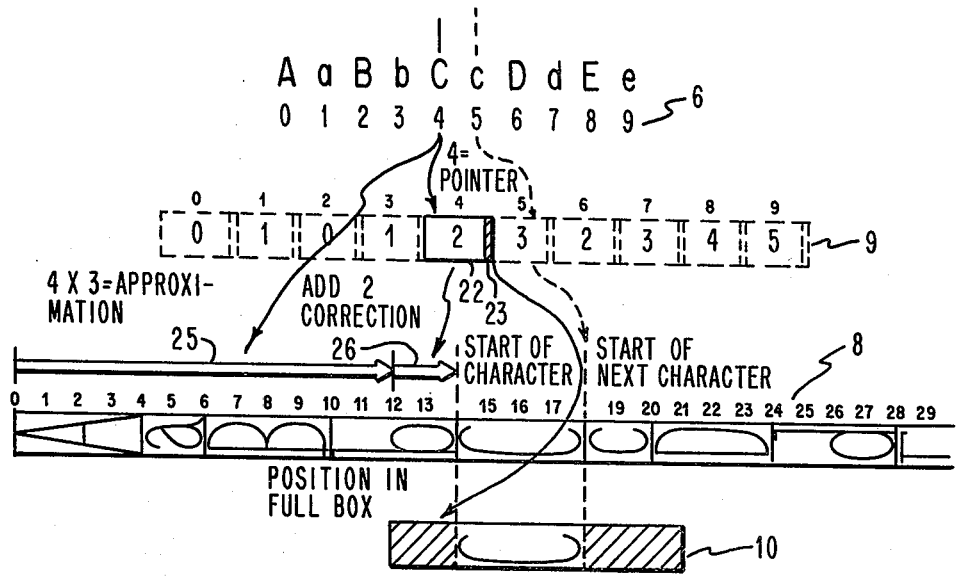
FIG. 7 is a representation of the sequence of steps performed in carrying out the technique of this invention.
FIG. 8 shows a display image utilizing the image data of the font stored according to Table 2.

Referring now to FIG. 6, the technique of this invention is charted as a sequence of steps to be performed relative to the data structures of FIG. 7. The technique will be explained using specific word lengths and bit numbers, but it will be understood by those skilled in the art that this is merely an expedient of illustration and is not a limitation.

In FIG. 7, the pointer table 9, the scroll of compressed images 8, and the display memory 10 are numbered as in FIGS. 3 and 4. The text stream 6 is illustrated to contain a coincidental ordering of the images in scroll 8. If the text instead consisted of the word "Cab", for example, the text stream 6 would contain the ordered numbers 4, 1, 3.

The technique of this invention is entered at block 20 of FIG. 6 with a number from a text stream corresponding to a particular character, such as the number 4 corresponding to a C as in FIG. 7. In block 21 of FIG. 6 this character number is used as an address into the pointer table 9 to access the data at element number 4 of the pointer table. The data at element number 4 consists of two parts, a correction factor offset 22 of, for example, seven bits which is illustrated in FIG. 7 to be the number 2, and a position pointer 23 to be used later which may be the remaining bit of an eight bit byte stored at an element of the symbol memory 3 associated with the text character "C".

In block 24 of the FIG. 6 a pointer is derived to obtain the address in the scroll 8 of memory 3 at which the beginning of the image data associated with a "C" is stored. This pointer derivation begins with the calculation of an approximate pointer (reference numeral 25) which is found by multiplying the character number (4) by an average height, which is referred to as an approximate pel dimension number of a character which, in this example, is 3. Thus, the approximate pointer 25 is the number 12. The correction factor 22 in this example is the number 2. Thus an addition of the quantity 12 (approximate pointer 25) and the quantity 2 (the correction factor offset 22) results in an address of 14 which is the beginning address of the image data stored in the scroll 8 of memory 3.

To summarize the derivation of the address which begins the image data for a desired character: a "C" is represented in a character stream by the integer 4, providing an address pointer to element number 4 of a memory array holding the offset integer 2. The integer 4 is multiplied by 3, which is the average height of a character in a compressed scroll, which yields an approximate pointer of length 12. To this approximate pointer of length 12 is added the correction offset integer 2 to yield the pointer of length 14 indicating the starting location of "C" in the image scroll 8.

Referring now to block 30 of FIG. 6, the extent of the image data for the "C" in scroll 8 of memory 3 is calculated. This extent is found by determining the address in scroll 8 of the start of the image data for the next succeeding character and assuming that all image data up to that address is part of the current character. In this example reference is first made to the pointer table 9 in symbol memory 3 to determine the offset correction factor for the character immediately succeeding the "C" or fifth character in the pointer table. This offset is seen to be a 3. Multiplying the average height of a character, 3, by 5 (the fifth character in the scroll 8) gives an approximate pointer of 15. The sum of the approximate pointer which is 15 and the offset correction factor which is 3 is 18 which is the address in the scroll 8 at which the image data of the next character succeeding the "C" begins. Thus the image data for the "C" terminates at the end of the data at address 17 of scroll 8.

Another technique for determining the termination of the image data for the "C" or $n^{th}$ character is to add the approximate height (3, for these examples) to the previously obtained address for the start of the image data for the $n^{th}$ character. For the character "C" in this example the address is 14. Thus the sum of the previously obtained address, 14, and 3 is 17. To this first sum is added the limited range correction factor for the n+1 character, "c", which, in the example above is 3. This yields a second sum of 20. From this second sum is subtracted the limited range correction factor for the $n^{th}$ character, "C", which is 2. This yields an exact address of 18 for the beginning address of the image data immediately succeeding the image data for the $n^{th}$ character, "C". Subtracting 1 yields 17 which is the ending address of the desired character.

A comma and an apostrophe may each have the same pel pattern and character extent but the images thereof should occupy different levels in the reconstructed character box. This level computation is performed in block 32 of FIG. 6 by using the position pointer 23, mentioned above relative to FIG. 7. This position pointer is used to select one of several possible rows within the character box at which the highest non-blank row of the character image is to be placed. Referring to FIG. 5, it is seen, that excluding diacritics, 90% of all characters begin with a top row at one or the other of two levels corresponding to the top of a A and the top of a lower case a. For the description of this preferred embodiment, a single bit position pointer 23 can be used to indicate either of these two cases. The remaining 10% of the characters can be forced into alignment by padding with blank rows in the scroll 8 of memory 3. This padding, of course, increases the memory requirement in the scroll section of the memory. The padding may be eliminated by refining the position pointer 23 to include more bits; however, this would increase the memory requirements for the pointer table 9 of memory 3.

Referring to block 34 of FIG. 3, all information is now available to transfer the character image data from the character scroll 8 of FIGS. 1 and 3 to the bit map image of FIG. 4 that will be displayed or printed.

The Fortran program of Table 1 below is a preferred embodiment of the font decompression technique of this invention. Comments imbedded in the program parallel the block labels of FIG. 6. In this program, image "bits" are actually character-wide bytes in one of two states: blank or with an "X". The pointer table 9 of FIG. 7 is programmed as 32-bit wide elements; however, only the lower-order byte bears information. Other Fortran expedients include the use of division by 2 to simulate a 1-bit shift, and the use of integer arithmetic in the phrase (POINT-POINT/2*2) to isolate the least significant bit of POINT. Other data manipulations will be obvious to those skilled in the art of Fortran programming. Fortran is used to illustrate the principles of this invention in a widely understood form and is not represented as the only embodiment of the technique of this invention.

TABLE 1

| list pat. fort PAT.FORT | |
|---|---|
| 00010 | IMPLICIT INTEGER*4 (A-Z) |
| 00020 | DIMENSION SCROLL(39),ARRAY(9),LEVEL(2),BITMAP(11,8) |
| 00030 | DATA BLANK/' '/,LEVEL/2,4/ |
| 00040 | READ(5,10) (SCROLL(COUNT),COUNT=1,39) |
| 00050 10 | FORMAT(A4) |
| 00060 | DO 30 LETTER=1,9 |
| 00070 | READ(5,20)OFFSET,BIT |
| 00080 20 | FORMAT(2I2) |
| 00090 30 | ARRAY(LETTER)=(OFFSET+64)*2+BIT |
| 00100 | DO 40 X=1,11 |
| 00110 | DO 40 Y=1,8 |
| 00120 40 | BITMAP(X,Y)=BLANK |
| 00130 | DO 70 X=1,11 |
| 00140 C | |
| 00150 C | ENTER WITH CHARACTER CODE NUMBER |
| 00160 C | |
| 00170 | READ(5,50) LETTER |
| 00180 50 | FORMAT(I2) |
| 00190 C | |
| 00200 C | ADDRESS POINTER ARRAY USING CHARACTER NUMBER |
| 00210 C | |
| 00220 | POINT=ARRAY (LETTER) |
| 00230 C | |
| 00240 C | COMPUTE STARTING VECTOR TO CHARACTER SCROLL ARRAY |
| 00250 C | |
| 00260 | OFFSET=POINT/2-64 |
| 00270 | VECTOR=LETTER*4+OFFSET |

TABLE 1-continued

```
list pat. fort
PAT.FORT

00280 C
00290 C    COMPUTE CHARACTER EXTENT IN CHARACTER SCROLL ARRAY
00300 C
00310          EXTENT=4+ARRAY(LETTER + 1)/2−ARRAY(LETTER)/2
00320 C
00330 C    COMPUTE CHARACTER POSITION IN FULL BOX
00340 C
00350          HEIGHT=LEVEL(POINT−POINT/2*2 +1)
00360 C
00370 C    COPY CHARACTER TO IMAGE BITMAP
00380 C
00390          DO 60 COUNT=1,EXTENT
00400 60       BITMAP(X,HEIGHT + COUNT−1)=SCROLL(VECTOR+COUNT−1)
00410 C
00420 C
00430 70   CONTINUE
00440      WRITE(6,80) ((BITMAP(X,Y),X=1,11),Y=1,8)
00450 80   FORMAT(1X,11A4)
00460      STOP
00470      END
READY
```

TABLE 2

```
list pad. data
PAD.DATA

00010   XX
00020   XX
00030   X X
00040   XXX
00050   XX
00060   X X
00070   XXX
00080    X
00090   XX
00100   X
00110   X
00120   XX
00130   XXX
00140   X X
00150   X X
00160    X
00170   X X
00180   X X
00190    X
00200   XX
00210   X X
00220   XXX
00230   X
00240   X
00250   XX
00260   XXX
00270   X
00280   X
00290
00300   X
00310   XXX
00320   X
00330   XX
00340   XX
00350   X X
00360   X X
00370   XX
00380    X
00390   XX
00400   −3 1
00410   −3 1
00420   −2 0
00430    0 1
00440    0 1
00450    1 1
00460    1 0
00470    3 1
00480    4 0
00490    5
00500    3
00510    4
00520    7
```

TABLE 2-continued

```
list pad. data
PAD.DATA 00530    4
00540    2
00550    6
00560    1
00570    5
00580    3
00590    8
READY
```

Tables 1 and 2 contain data which may be interpreted by a computer to generate a sample preferred embodiment of the technique of this invention. Table 1 lists the Fortran source, and Table 2 lists a data file acted on by a computer executing code generated from the Fortran source, and accessed through Fortran unit 5. The resulting image output to a printer through Fortran unit 6 is shown in FIG. 8.

Other implementation expedients may be utilized for the display of graphics, proportionally spaced characters of varying widths, etc., and would require additional program and pointer memory. For example, if diacritics are included in a font a preferred embodiment implementation is as follows: An extra bit is allocated for each character in the printer array 9. If this bit is clear for a character being decompressed, this indicates there is no diacritic for that character and the technique proceeds as before. However, if the bit associated with a particular character is set, this indicates that the character has an associated diacritic. In this case the technique proceeds as before except the last row of the character image from scroll 8 is not transferred to the display. Rather, this position is interpreted as having been loaded with a character number rather than image data. This character number is used to re-enter the process a second time and proceed as before using the new character number, except that the new character is overstruck, or written to the same box as the original character. Also, given a prior knowledge that the new character is a diacritic, the starting character height is increased to permit starting above a standard upper case character height. If characters can be arbitrarily arranged, then an ordering exists for which the offset correction factor is always less than eight. Accordingly, the offset correction factor might be represented by 3 bits. Those 3 bits and a 1 bit vertical placement marker permit half a byte of pointer memory per character. This provides for extremely efficient use of memory for storing image fonts. Additionally, a hardware realization of the software logic of this technique is also possible and quite practical with high speed hardware.

While the invention has been shown and described with reference to particular embodiments thereof, it will be understood by those skilled in the art that the foregoing and other changes in form and details may be made therein without departing from the spirit and scope of the invention.

What is claimed is:

1. In a method for displaying or printing image data stored sequentially in a compressed font memory, the improvement for deriving an address for the beginning of the image data associated with a particular coded character and for displaying or printing said image data, comprising:
   multiplying the code of said particular coded character by an approximate pel dimension number to obtain an approximation of an address in said font memory at which said beginning of said image data is stored;
   adding a limited range correction factor to said approximation to obtain said address; and
   transferring to a display memory or direct display device, image data stored at said address for printing or displaying said stored image data.

2. In the method of claim 1, further comprising:
   addressing a pointer offset table at an address determined by the code of said particular coded character to obtain said limited range correction factor.

3. In a method for displaying or printing image data stored sequentially in a compressed font memory, the improvement for determining the termination of the image data associated with a particular coded character and for displaying or printing said image data, comprising:
   multiplying the code of the character associated with the image data stored in said compressed font memory immediately succeeding the image data associated with said particular coded character by an approximate pel dimension number to obtain an approximation of an address in said font memory at which the image data immediately succeeding the image data of said particular coded character begins;
   adding a limited range correction factor minus one of said approximation to obtain the font memory address of the end of said image data of said particular coded character; and
   during transfer of said image data of said particular coded character to a display memory or direct display device, inhibiting the transfer of said image data beyond said font memory address of said end of said image data of said particular coded character.

4. In the method of claim 3, further comprising:
   addressing a pointer table at an address determined by the code of the character associated with the image data stored in said font memory immediately succeeding the image data associated with said particular coded character to obtain said limited range correction factor.

5. In a method for displaying or printing image data stored sequentially in a compressed font memory in an order directly related to codes of characters, the improvement for determining the extent of the image data associated with a particular coded character and for displaying or printing said image data, comprising:
   adding to an approximate pel dimension number a second limited range correction factor associated with the character code associated with the image data in said font memory immediately succeeding the image of said particular coded character to obtain a first sum;
   substracting from said first sum first limited range correction factor associated with said particular coded characters; and
   transferring to a display memory or direct display device said image data associated with said particular character determined by said substracting.

6. The method of claim 5, further comprising:
   addressing a pointer offset table at an address determined by the code of said character code associated with the image data in said font memory immediately succeeding the image data of said particular coded character to obtain said second limited range correction factor.

7. In the method of claim 6, further comprising:
   addressing a pointer offset table at an address determined by the code of said particular coded character to obtain said first limited range correction factor.

8. A method for displaying or printing image data stored sequentially in a compressed font memory, comprising:
   multiplying a code representing a particular character by an approximate pel dimension number to obtain an approximation of an address in said font memory at which said beginning of said image data is stored;
   adding a limited range correction factor to said approximation to obtain an address in said font memory at which the image data associated with said particular coded character begins; and
   displaying or printing said stored image data in a particular one of a number of relative vertical placements according to one or more data bits associated with said particular character code.

9. The method of claim 8, further comprising:
   addressing a pointer offset table at an address determined by to the code of said particular coded character to obtain said limited range correction factor.

10. The method of claim 9, further comprising:
    storing said one or more data bits in said pointer table with said limited range correction factor which has an address determined by the code of said particular coded character.

11. The method of claim 10, further comprising determining the termination of the image data associated with said particular coded character, including:
    multiplying the code of the character associated with the image data stored in said compressed font memory immediately succeeding the image data associated with said particular coded character by an approximate pel dimension number to obtain an approximation of an address in said font memory at which the image data immediately succeeding the image data of said particular coded character begins; and
    adding a limited range correction factor minus one to said approximation to obtain the font memory address of the end of said image data of said particular coded character.

12. The method of claim 10, further comprising determining the termination of the image data associated with said particular coded data, including:
storing said image data in said compressed font memory in an order directly related to the codes of characters;
adding said approximate pel dimension number to said address in said font memory at which said beginning of said image data is stored to obtain a first sum;
adding to said first sum a second limited range correction factor minus one associated with the character code associated with the image data in said font memory immediately succeeding the image of said particular coded character to obtain a second sum; and
substracting from said second sum a first limited range correction factor associated with said particular coded character.

13. The method of claim 12, further comprising:
addressing a pointer offset table at an address determined by the code of said character code associated with the image data in said font memory immediately succeeding the image data of said particular coded character to obtain said second limited range correction factor.

14. In the method of claim 13, further comprising: addressing a pointer offset table at an address determined by the code of said particular coded character to obtain said first limited range correction factor.

15. In a system for displaying or printing characters associated with character codes stored in a text memory, the improvement for decompressing character image data stored in a compressed symbol memory, comprising:
means for multiplying a code representing a particular character stored in said text memory by an approximate pel dimension number to obtain an approximation of an address in said compressed symbol memory at which said beginning of image data associated with said particular character is stored;
means, associated with said means for multiplying, for adding a limited range correction factor to said approximation to obtain an address in said symbol memory at which the image data associated with said particular character begins; and
means, connected to said means for adding, for transferring to a display memory or direct display device, said stored image data for printing or displaying said stored image data beginning at a particular one of a number of relative vertical placements according to one or more data bits associated with said character code.

* * * * *

UNITED STATES PATENT AND TRADEMARK OFFICE
CERTIFICATE OF CORRECTION

PATENT NO. : 4,481,602

DATED : November 6, 1984

INVENTOR(S) : K. A. Bohrer et al

It is certified that error appears in the above—identified patent and that said Letters Patent is hereby corrected as shown below:

Column 9, line 50, "of" should read --to--.

Signed and Sealed this

Second Day of April 1985

[SEAL]

Attest:

DONALD J. QUIGG

Attesting Officer   Acting Commissioner of Patents and Trademarks